(12) United States Patent
Huart et al.

(10) Patent No.: US 7,136,398 B1
(45) Date of Patent: Nov. 14, 2006

(54) METHOD AND APPARATUS FOR ADDING FUNCTIONALITY TO AN EXISTING CONFERENCE CALL

(75) Inventors: Pascal H. Huart, Dallas, TX (US);
Luke K. Surazski, San Jose, CA (US);
Michael E. Knappe, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1024 days.

(21) Appl. No.: 10/098,270

(22) Filed: Mar. 14, 2002

(51) Int. Cl.
*H04L 12/56* (2006.01)

(52) U.S. Cl. ...................... 370/503; 370/260

(58) Field of Classification Search ............... 370/260, 370/261, 503, 401; 348/512, 515
See application file for complete search history.

(56) References Cited

U.S. PATENT DOCUMENTS

| | | | |
|---|---|---|---|
| 5,506,954 A | * | 4/1996 | Arshi et al. .................. 345/501 |
| 5,689,553 A | * | 11/1997 | Ahuja et al. ........... 379/202.01 |
| 5,953,049 A | * | 9/1999 | Horn et al. ............... 348/14.09 |
| 6,259,785 B1 | | 7/2001 | Shaffer et al. .............. 379/265 |

* cited by examiner

*Primary Examiner*—Derrick Ferris
(74) *Attorney, Agent, or Firm*—Baker Botts L.L.P.

(57) ABSTRACT

A method for synchronizing media in a call includes receiving a first input stream of packets of a first media type at a first call resource, generating a first output stream in response to the media streams, receiving synchronization information from a second call resource, and communicating the output stream from the first call resource to a endpoint in synchronization with the second call resource. A video conference bridge includes a first interface operable to receive a video input stream, a processor operable to generate video output, and a second interface operable to receive synchronization information from an audio conference bridge.

29 Claims, 2 Drawing Sheets

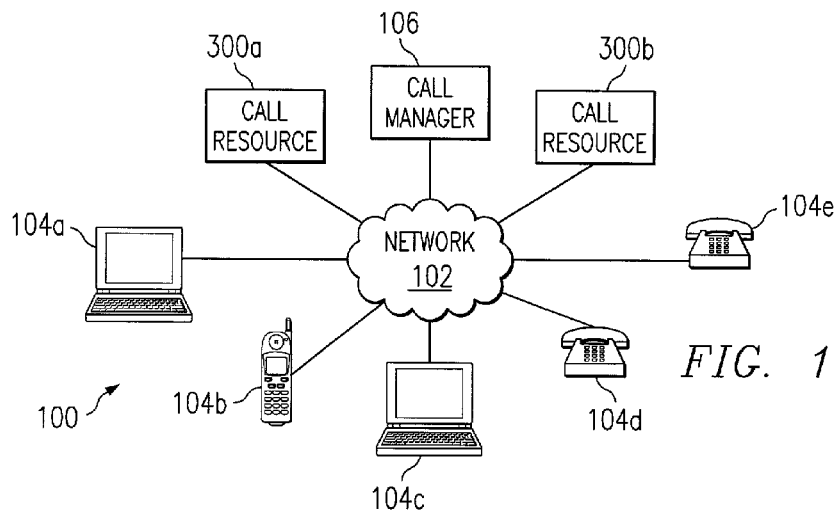
FIG. 1
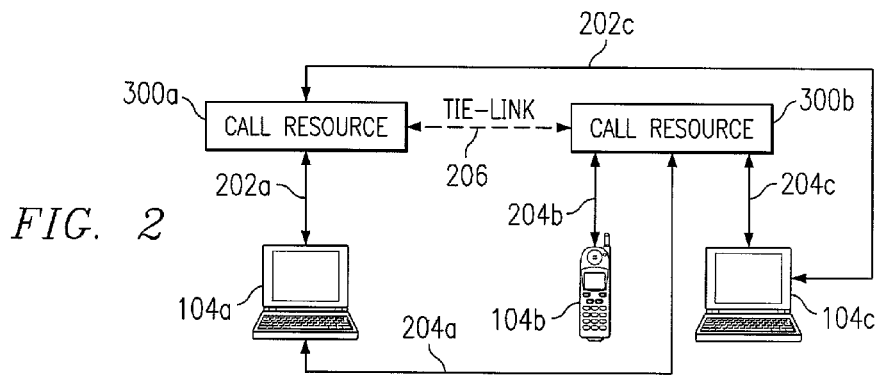
FIG. 2
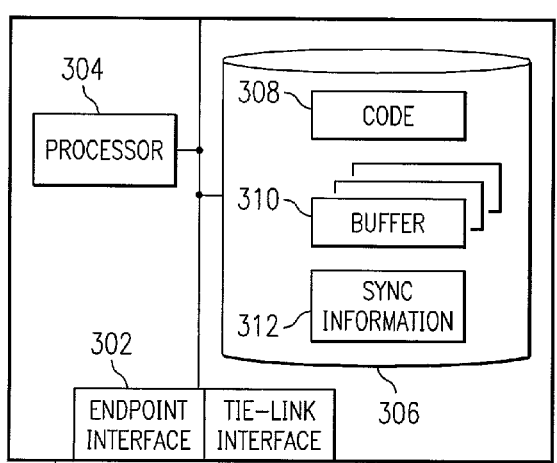
FIG. 3
| CALL ID | TIME SENT (ms) | TIME RECEIVED (ms) | READY TIME (ms) |
|---|---|---|---|
| a | 0 | 7 | 10 |
| b | 13 | 22 | 25 |
| c | 24 | 30 | 33 |
| a | 31 | 37 | 41 |
| b | 41 | 46 | 50 |
| c | 52 | 60 | 64 |
FIG. 4

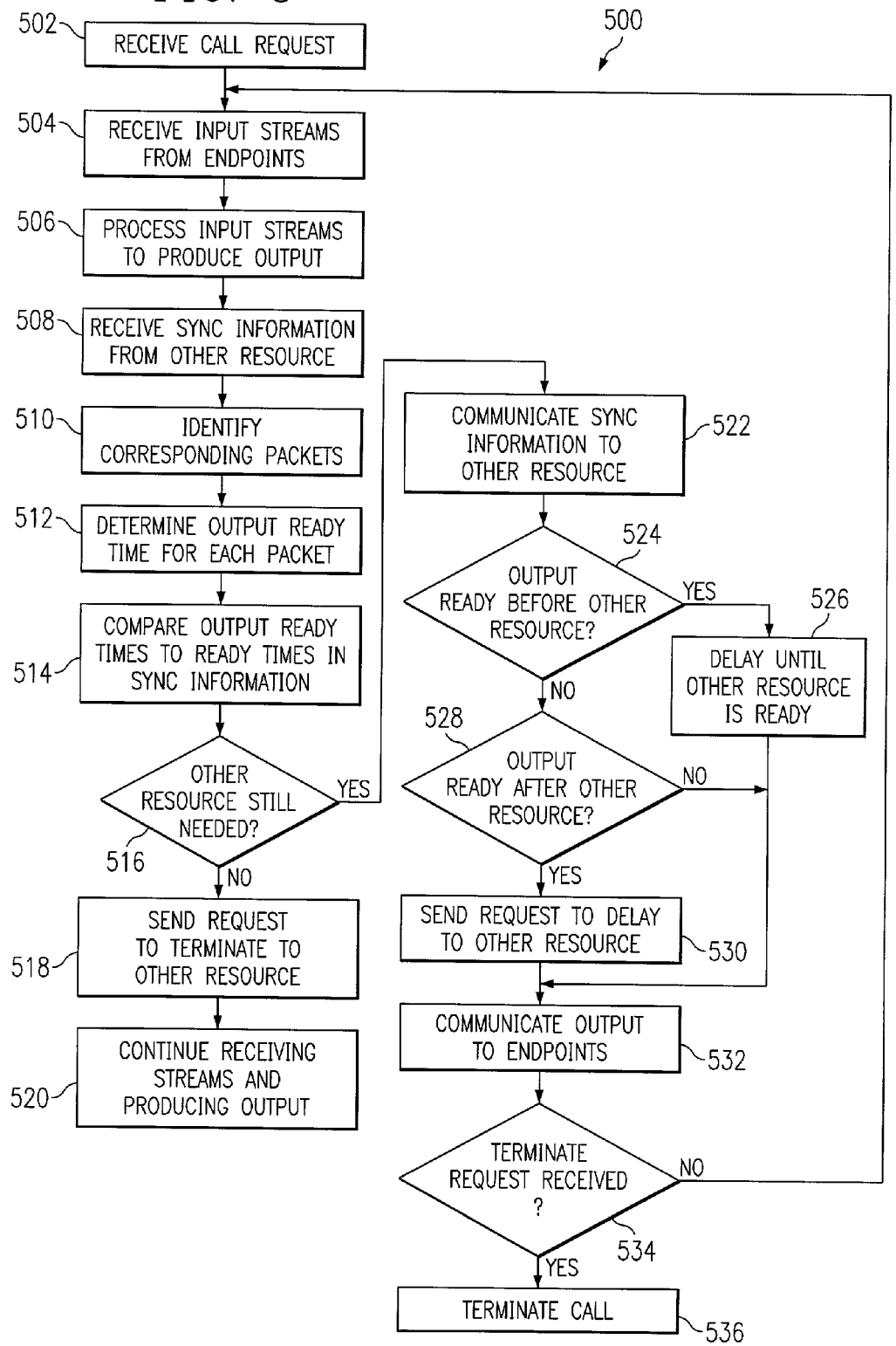

METHOD AND APPARATUS FOR ADDING FUNCTIONALITY TO AN EXISTING CONFERENCE CALL

TECHNICAL FIELD OF THE INVENTION

This invention relates in general to packet-based communication networks, and more particularly to a method and apparatus for adding functionality to an existing conference call.

BACKGROUND OF THE INVENTION

Consumers in business continue to demand more sophisticated communication systems that allow increasing numbers of people to participate in conference calls using audio, video, and other data. In response to these demands, network endpoints have been designed with increasing capacity to send and receive various kinds of media. Call resources receive media from network endpoints and produce output streams which are then returned to endpoints. Different types of media require different call resources. More sophisticated conference calls involving a variety of media and endpoints present challenges for ensuring efficient use of high-capability resources.

SUMMARY OF THE INVENTION

In accordance with the teachings of the present invention, the disadvantages and problems associated with managing call resources have been substantially reduced or eliminated. In a particular embodiment, a method for adding functionality to an existing conference call is disclosed that allows a call resource with additional capability to be incorporated into an existing conference call.

In accordance with one embodiment of the present invention, a method synchronizing media in a call includes receiving a first media stream of a first media type at a first call resource and generating a first output stream in response to the first input stream. The method also includes receiving synchronization information from a second call resource operable to generate a second output stream of a second media type in response to a second input stream. The method further includes communicating the first output stream to a endpoint in synchronization with the second output stream using the synchronization information.

In accordance with another embodiment of the present invention, a call resource comprises a first interface, a second interface, and a processor. The first interface receives a first input stream of a first media type. The processor generates a first output stream of a first output type. The second interface receives synchronization information from a second call resource operable to generate a second output stream in response to a second input stream of a second media type. The processor communicates the first output stream to a endpoint in synchronization with the second output stream using the synchronization information.

Another embodiment includes a method for synchronizing lip movement in video output with speech in audio output. The method includes receiving a video input stream at a video conference bridge and receiving synchronization information from an audio conference bridge. The method also includes communicating video output from the video conference bridge to one or more video-enabled endpoints in synchronization with audio output from the audio conference bridge using the synchronization information.

In yet another embodiment, a video conference bridge includes a first interface operable to receive a video input stream, a processor operable to generate video output in response to the video input stream, and a second interface operable to receive synchronization information from an audio conference bridge. The processor is further operable to communicate the video output to one or more video-enabled endpoints in synchronization with audio output from the audio conference bridge using the synchronization information.

Important technical advantages of certain embodiments of the present invention include allowing additional functionality to be added to an existing conference call. This allows a conference call to be established on a call resource with limited capability, and then moved to another call resource as additional functionality becomes necessary. This reduces over-utilization of high capability call resources.

Another important technical advantage of certain embodiments of the present invention is the ability to add synchronized video to an existing audio conference call. The video conference bridge may produce video output with lip movement of the participants synchronized with their speech. This preserves high quality communication in a dynamic conference environment.

Yet another important technical advantage of certain embodiments of the present invention is seamless transfer of a conference call from a low capability call resource to a higher capability call resource. For example, media streams to one call resource may be duplicated to a second call resource. The second call resource then produces a duplicate output stream, and sends a message requesting the first call resource to stop transmitting output. The second call resource then communicates its duplicate output to endpoints, allowing the first call resource to be allocated to a new conference call.

Particular embodiments of the present invention may include some, all, or none of the technical advantages described above. Additional technical advantages of various embodiments of the invention will be readily apparent to one skilled in the art. The technical advantages of the present invention can be better understood by reference to the following figures, description, and claims.

BRIEF DESCRIPTION OF THE DRAWINGS

For a more complete understanding of the present invention and its advantages, reference is now made to the following description, taken in conjunction with the accompanying drawings, in which:

FIG. 1 illustrates a block diagram of a communication system that supports adding functionality to an existing conference call;

FIG. 2 illustrates a conceptual drawing of the interconnections between call resources and network endpoints in the communication system;

FIG. 3 illustrates a call resource in the communication system;

FIG. 4 shows a table including synchronization information; and

FIG. 5 is a flowchart showing a method by which functionality can be added to a conference call.

DETAILED DESCRIPTION OF THE INVENTION

FIG. 1 shows a communication system 100 that includes call resources 300a and 300b (generally referred to as resources 300), network endpoints 104a–104e (generally referred to as endpoints 104), and a call manager 106 coupled together by network 102. Communication system 100 allows endpoints 104 and resources 300 to exchange voice, video, data, or other information (generally referred to as "media") in calls. The term "call" refers broadly to any exchange of media between two or more endpoints 104, and may include simultaneous exchanges of multiple types of media. Although a specific communication system is shown, it is understood that communication system 100 includes any combination of resources 300 and endpoints 104 on network 102, in any number or arrangement.

Network 102 may be a local area network (LAN), a wide area network (WAN) the Internet, or any other suitable network that transmits packets, cell, frames, or other segments or portions of information (generally referred to as "packets"). Network 102 may include routers, hubs, switches, gateways, and any other suitable hardware and/or software for communication of information. Network 102 may employ any suitable protocol, such as Internet protocol (IP), frame relay, asynchronous transfer mode (ATM), synchronous optical network (SONET), or other suitable techniques for communicating packets. Network 102 may also be coupled to a non-packet-based network, such as the public switched telephone network (PSTN), a private branch exchange (PBX), or any other appropriate network that allows transmission of media.

Endpoints 104 allow a user to send and receive media over network 102. Endpoints 104 communicate media in the form of media streams. The term "media stream" refers to a series of packets of media; the packets may be communicated synchronously, asynchronously, sporadically, continuously, or in any other sequence or arrangement. Possible endpoints 104 include telephony software running on a computing device, traditional plain old telephone (POTS) devices, analog phones, digital phones, IP telephony devices, or other computing and/or communication devices that communicate media using analog and/or digital signals. Endpoints 104 may also include cordless or cellular telephones, personal digital assistants (PDAs), or other wireless devices. In a particular embodiment, endpoints 104 may include one or more endpoints 104 that have the ability to send and/or receive different or additional types of media than other endpoints 104.

System 100 also includes resources 300 that receive media streams of various types from endpoints 104 and construct output streams in response to the input streams. Resource 300 mix, encode, decode, and/or transcode different types of media streams into a proper format using a media processor. Resources 300 may include multiple media processors to exchange and mix media streams associated with endpoints 104. Resources 300 may include any combination of hardware and/or software, accessible locally or remotely, suitable for receiving media streams from endpoints 104 and producing output streams in response. Software to perform the functions of resource 300 may be embodied in any type of medium, such as hard drives, diskettes, CD-ROMs, DVD-ROMs, optical or magnetic media, embedded processors, or any other suitable media. Resources 300 may also be able to receive multiple types of media. For example, resource 300 may be a video conference bridge with the ability to receive audio streams and create an audio output as well as to receive video streams and create a video output.

Call manager 106 manages overall operation of calls in network 102. Call manager 106 may be implemented as hardware, software, or a combination of the two. Call manager 106 handles all manner of call processing, including assignment of bandwidth, assignment of resources 300, selection of compression algorithms, or any other suitable task related to establishing a communication between endpoints 104.

In operation, system 100 allows functionality to be added to a conference call taking place between endpoints 104 on a particular call resource, e.g., call resource 300a, over network 102. During a conference call, a particular endpoint 104a may indicate to call manager 106 that the user wishes to add functionality to an existing conference call on call resource 300a. Alternatively, call manager 106 may detect that endpoints 104a and 104c have additional functionality that is not supported by the current call resource 300a. After call manager 106 determines that there is a need for additional functionality, call manager 106 assigns resource 300a to the conference call, and instructs endpoints with additional functionality 104a and 104c to begin streaming media to resource 300a.

Call manager 106 also instructs resource 300a establishes a tie-link with resource 300b. The tie-link includes any link, whether virtual or physical, that allows resource 300a and resource 300b to exchange information associated with media processing of the call. Resources 300a and 300b communicate synchronization information using the tie-link, allowing resources 300a and 300b to send their respective outputs to endpoints 104 so that the respective outputs will arrive at any particular endpoint 104 in synchronization. Resources 300 may also communicate information to endpoints 104 that allows endpoints 104 to synchronize media during playback.

FIG. 2 shows a conceptual diagram of the interaction between call resources 300 and endpoints 104. In the embodiment shown, call resource 300a has the capability to process a kind of media stream that call resource 300b cannot process. For example, resource 300a is a video conference bridge (VCB) 300a, and resource 300b is an audio conference bridge (ACB) 300b. Although the discussion below focuses specifically on this example, the concepts apply equally to any resources 300a with the ability to process different types of media or the same type of media in different ways.

Endpoints 104a and 104c exchange video data with VCB 300a using links 202 established over network 102. All endpoints 104 also exchange audio data with ACB 300b over links 204. Links 202 and 204 represent any physical or virtual connection assigned to the call that enables communication between resource 300a and endpoints 104a and 104c, including wireless connections, wireline connections, assigned bandwidth, etc.

VCB 300a and ACB 300b exchange information associated with processing the call over tie-link 206. Tie-link 206 includes any connection, virtual or physical, wireless or wireline, that supports exchange of information between VCB 300a and ACB 300b. In particular, VCB 300a and ACB 300b use tie-link 206 to exchange synchronization information to assist VCB 300a and ACB 300b to synchronize their respective output.

Synchronization information includes any variety of information that is useful for allowing the output streams from VCB 300a and ACB 300b to arrive at endpoints 104 at the same time. In particular, synchronization information may include timing information from the media packets used by the protocol of network 102. For example, in a real-time protocol (RTP) network, the header of each packet includes a synchronization source identifier (SSRC) identifying the source of the packet, and a network time protocol (NTP) timestamp indicating when the packet was sent by the source. If ACB 300b communicates the header of each audio packet as part of the synchronization information, VCB 300a can identify a video packet sent from the source at the same time corresponding to each audio packet.

In operation, ACB 300b receives audio input streams from links 204, and generates audio output that is typically tailored for each endpoint 104. The input streams are stored in a buffer to allow enough time for packets to arrive and for ACB 300b to generate audio output. Generating audio output includes mixing the input streams into a single output stream. In order to prevent echo, ACB 300b modifies the audio output for each endpoint 104 by removing the audio sent by that endpoint 104 from the mix. ACB 300b then communicates the modified audio output to the proper endpoint 104.

At some point during the call, call manager 106 determines that VCB 300a should enter the call, and establishes links 202 to video-enabled endpoints 104a and 104c that are enabled to send video, receive video or both. VCB 300a receives video input from links 202, and generates video output, which may be tailored for each endpoint 104. The input streams are stored in a buffer to leave enough time for packets to arrive and for VCB 300a to generate video output. Examples of video output include a tiled arrangement showing all of the users of endpoints 104, a single display of a user who is currently speaking, a display to each user of the other users, etc. VCB 300a also monitors the amount of time required to generate the video output, which varies based on number of input streams, the processing resources available, the complexity of the output, and the delay associated with buffering the input streams.

Call manager 106 also establishes tie-link 206 between VCB 300a and ACB 300b. ACB 300b communicates synchronization information to VCB 300a using tie-link 206. Synchronization information includes information identifying audio input packets as well as a predicted time at which the output corresponding to each input packet will be ready for communication to endpoints 104. VCB 300a identifies a video input packet corresponding to an audio input packet using the synchronization information. For example, in an RTP network, VCB 300a looks for video packets associated with the same endpoint and with the same NTP timestamp as an audio input packet. To determine the endpoint associated with a particular packet, VCB 300a may consult a call identifier or other suitable information, which may be stored by call manager 106.

VCB 300a then determines when the video output corresponding to each video packet will be ready for communication to endpoints 104a and 104c. If VCB 300a will be ready to communicate the output corresponding to a packet before ACB 300b is ready to communicate the corresponding audio output, VCB 300a delays its output appropriately. If, on the other hand, VCB 300a will not be ready before ACB 300b, VCB 300a sends a message using tie-link 206 to ACB 300b instructing ACB 300b to delay communicating its audio output until the corresponding video output is ready for communication.

FIG. 3 shows an exemplary embodiment of call resource 300. Call resource 300 comprises an endpoint interface 302, a processor 304, a memory 306, and a tie-link interface 314. Memory 306 stores code 308 executed by processor 304 to manage the components of call resource 300, a buffer for storing media streams 310, and synchronization information 312.

Endpoint interface 302 is any connection or port, real or virtual, suitable for coupling call resource 300a to network 102. Endpoint interface 302 receives input streams from endpoints 104 and sends output streams to endpoints 104. In a particular embodiment, endpoint interface 302 may include multiple hardware and/or software components, such as line cards.

Tie-link interface 314 receives synchronization information 312 from another resource 300, and communicates messages to other resource 300. Tie-link interface 314 may represent a real or virtual connection embodied in a separate hardware or software component from endpoint interface 302. More commonly, tie-link interface 314 is a functional description that indicates that endpoint interface 302 is being used to receive information from another resource 300.

Processor 304 may be a microprocessor, a microcontroller, a digital signal processor (DSP), any combination of these components, or any other digital circuitry suitable to manage components of call resource 300a and process information. Processor 304 receives media streams and constructs output streams in response. In order to give processor 304 enough time to construct output streams and in order to allow sufficient time for packets to arrive, incoming media streams are stored in a buffer 310. Processor 304 also uses synchronization information 312 to determine a proper time to communicate output streams so that the output from call resource 300 is synchronized with the output from another call resource 300b.

Memory 306 may include any type of information storage, whether volatile or nonvolatile, including but not limited to: magnetic media, optical media, random access memory (RAM), read only memory (ROM), removable media, or any other suitable local or remote memory component. Memory 306 stores code 308 executed by processor 304 to control components of call resource 300. Memory 306 also stores incoming audio streams in buffer 310. Memory 306 may also store synchronization information 312 received from another call resource 300. In a particular embodiment, synchronization information 312 is stored as a table associating network times with endpoint identifiers.

FIG. 4 illustrates a table 400 that summarizes synchronization information sent to resource 300a by resource 300b. Table 400 includes the following information for each packet received by resource 300b: an endpoint identifier 402 for the endpoint 104 that sent the packet, a time sent 404 representing the time when endpoint 104 sent the packet, a time received 406 representing the time when resource 300b received the packet, and a ready time 408 representing the time when the output corresponding to the packet will be ready for communication to endpoint 104. Times may be measured by a network clock, a common clock, a distributed clock, or any other suitable timing device.

Endpoint identifier 402 includes any unique identifier indicating the origin of the packet. For example, endpoint identifier 402 may be a call identifier assigned by call manager 106 for each endpoint 104 in a conference call. Time sent 404 is a timestamp that indicates when endpoint 104 sent the packet. Time received 406 is a time that indicates when the packet was received by resource 300b. The relationship between time sent 404 and time received 406 for a given source may vary based on a number of factors including the performance of the source, the stability of network 102, and the type of media being sent.

Ready time 408 is a calculated quantity indicating when the output of resource 300b corresponding to a particular packet will be ready for communication to endpoint 104, and generally reflects the amount of processing required to prepare the output stream. The size of buffer 310 of call resource 300b and the number of packets received at a given time can also influence the amount of time required to make a packet ready for communication.

Resource 300a uses endpoint identifier 402 and time sent 404 to identify packets received by resource 300a that correspond to packets received by the resource 300b. For each packet received by resource 300a, resource 300a calculates a predicted time at which the output corresponding to that packet will be ready for communication to endpoint 104. Resource 300a then looks up ready time 408 for the corresponding input packet resource 300b in table 400. By comparing the ready times, resource 300a determines whether it needs to delay communicating output, to instruct resource 300b to delay its output, or to go ahead with communicating output at the predicted time.

Resource 300a may also perform additional calculations to improve synchronization. For example, resource 300a may subtract time sent 404 from time received 406 to determine how long it takes packets to reach resource 300b from endpoint 104. Resource 300a performs the same calculation for packets that resource 300a receives, and compares the results from each calculation. If there is a significant difference between the travel time from endpoint 104 to resource 300a and to resource 300b, resource 300a delays communicating its output, or instructs resource 300b to delay its output. In another example, resource 300a determines the amount of time required for resource 300b to process output by subtracting ready time 408 from time received 406. If resource 300a has a buffer 310 size less than the processing time of resource 300b, resource 300a can increase the size of its buffer 310 without delaying its output, thereby reducing the overall number of dropped packets without introducing any added delay.

FIG. 5 is a flowchart 500 showing a method for synchronizing media in a conference call. Resource 300a receives a call request from call manager 106 at step 502. Resource 300a receives input streams from endpoints 104 at step 504. Input streams may include duplicates of media streams sent to another resource 300b by endpoints 104. At step 506, resource 300a processes input streams to produce output.

Resource 300a receives synchronization information from resource 300b at step 508. Using the synchronization information, resource 300a identifies packets from the input streams that correspond to packets received by resource 300b at step 510. Resource 300a determines a ready time for the output corresponding to each packet it has received at step 512. Then, at step 514, resource 300a compares these ready times to the corresponding ready times in the synchronization information.

Resource 300a determines whether resource 300b is still necessary to preserve full functionality of the call at step 516. If resource 300b is no longer necessary, resource 300a sends a termination request to resource 300b instructing resource 300b to stop communicating output to endpoints 104 at step 518. Resource 300a continues to receive input streams and generate output streams until the call is terminated at step 520.

If resource 300b is still needed to preserve the functionality of the call, resource 300a sends synchronization information back to resource 300b, updating resource 300b on the status of resource 300a at step 522. Resource 300a determines whether its output will be ready before the corresponding output of resource 300b at step 524.

If resource 300a will have its output ready before the corresponding output of resource 300b, resource 300a delays its output by an appropriate amount at step 526, and communicates the output to endpoints 104 at step 532. If resource 300a will not have its output ready before resource 300a, resource 300a next determines whether the output will be ready after the output of resource 300b is ready at step 528. If the output of resource 300a will be ready after that of resource 300b, resource 300a sends a request to resource 300b to delay its output at step 530, then resource 300a communicates its output at step 532. If both outputs are ready at the same time, resource 300a communicates its output to endpoints 104 at step 532 as soon as the output is ready.

Once resource 300a has communicated its output to endpoints 104, resource 300a determines whether it has received a call termination request at step 534. If resource 300a has received a call termination request, resource 300a terminates the call at step 536. Otherwise, resource 300a continues to receive input streams, etc., at step 504.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for synchronizing media in a call, comprising:
   receiving at a first call resource a first input stream comprising packets of a first media type;
   generating a first output stream in response to the first input stream;
   receiving at the first call resource synchronization information from a second call resource, the second call resource operable to generate a second output stream in response to a second input stream comprising packets of a second media type different from the first media type, wherein the synchronization information comprises for each packet of the second media type:
      a packet identifier;
      a corresponding point along the second output stream; and
      a predicted time at which the corresponding point will be ready for communication; and
   communicating the first output stream to an endpoint in synchronization with a second output stream of the second call resource using the synchronization information.

2. The method of claim 1, wherein:
   each packet of the first media type comprises a first timestamp indicating when the packet was sent; and
   the packet identifier of the packets of the second media type comprises a second timestamp indicating when each packet of the second media type was sent.

3. The method of claim 2, wherein the synchronization information further comprises for each packet of the second media type a third timestamp indicating when the second call resource received the packet.

4. The method of claim 1, wherein the synchronization information comprises a minimum processing time for the second call resource to generate the second output stream, and the first call resource delays communication of the first output stream based on the minimum processing time.

5. The method of claim 1, wherein:
   the first call resource is a video conference bridge and the first input stream comprises a plurality of video packets; and
   the second call resource is an audio conference bridge and the second input stream comprises a plurality of audio packets.

6. The method of claim 1, wherein:
the first call resource is a stereo audio conference bridge; and
the second call resource is a mono audio conference bridge.

7. The method of claim 1, wherein:
the first call resource is an audio conference bridge; and
the second call resource is a text messaging conference bridge.

8. The method of claim 1, wherein the steps of the method are performed by logic embodied in a computer readable medium.

9. The method of claim 1, further comprising communicating a portion of the synchronization information to the endpoint enabling the endpoint to output media in synchronization.

10. A call resource, comprising:
a first interface operable to receive a first media stream comprising packets of a first media type;
a processor operable to generate a first output stream in response to the first input stream; and
a second interface operable to receive synchronization information from an other call resource, the other call resource operable to receive a second media stream comprising packets of a second media type and to generate a second output stream in response, wherein the processor is further operable to communicate the first output stream to a endpoint in synchronization with the second output stream of the other call resource using the synchronization information, and wherein the synchronization information comprises for each packet of the second media type:
a packet identifier;
a corresponding point along the second output stream; and
a predicted time at which the corresponding point will be ready for communication.

11. The call resource of claim 10, wherein:
each packet of the first media type comprises a first timestamp indicating when the packet was sent; and
the packet identifier of the packets of the second media type comprises a second timestamp indicating when each packet of the second media type was sent.

12. The call resource of claim 10, wherein the synchronization information further comprises for each packet of the second media type a third timestamp indicating when the other call resource received the packet.

13. The call resource of claim 10, wherein:
the synchronization information comprises a minimum processing time for the other call resource to generate the second output stream; and
the processor delays communication of the first output stream based on the minimum processing time.

14. The call resource of claim 10, wherein:
the first input stream comprises a plurality of video packets; and
the second input stream comprises a plurality of audio packets.

15. A system for synchronizing media in a call, comprising:
means for receiving at a first call resource a first input stream of a first media type from an endpoint in a conference call, the conference call comprising a second input stream of a second media type different from the first media type communicated from the endpoint to a second call resource, the second call resource operable to receive the second media stream and to communicate a second output stream to the endpoint in response to the second input stream;
means for constructing a first output stream in response to the first input stream;
means for receiving at the first call resource synchronization information from the second call resource, wherein the synchronization information comprises for each packet of the second media type:
a packet identifier;
a corresponding point along the second output stream; and
a predicted time at which the corresponding point will be ready for communication; and
means for using the synchronization information to communicate the first output stream to the endpoint in synchronization with the second output stream of the second call resource.

16. A method for synchronizing lip movement in video output with speech in audio output, comprising:
receiving a video input stream comprising video packets at a video conference bridge, the video conference bridge operable to generate video output in response to the video stream;
receiving at the video conference bridge synchronization information from an audio conference bridge, the audio conference bridge operable to receive an audio input stream comprising audio packets and to generate audio output in response, wherein the synchronization information comprises for each audio packet:
an audio packet identifier;
a point on the audio output corresponding to the audio packet; and
a predicted time at which the point will be ready for communication; and
communicating video output from the video conference bridge to one or more video-enabled endpoints using the synchronization information so that the video output is synchronized at the video-enabled endpoints with the corresponding audio output from the audio conference bridge.

17. The method of claim 16, wherein:
each video packet comprises a first timestamp indicating when the packet was sent; and
the audio packet identifier for each audio packet comprises a second timestamp indicating when the audio packet was sent.

18. The method of claim 17, wherein the synchronization information further comprises for each audio packet a third timestamp indicating when the audio packet was received at the audio conference bridge.

19. The method of claim 16, wherein the synchronization information further comprises a minimum processing time for the audio conference bridge to generate the audio output stream.

20. The method of claim 16, wherein the steps are performed by logic embodied in a computer readable medium.

21. A video conference bridge, comprising:
a first interface operable to receive a video input stream comprising video packets;
a processor operable to generate video output in response to the video input stream;
a second interface operable to receive synchronization information from an audio conference bridge, the audio conference bridge operable to receive an input audio stream comprising audio packets and to generate audio output in response, wherein the processor is further operable to communicate the video output to one or more video-enabled endpoints in synchronization with the audio output using the synchronization information, and wherein the synchronization information comprises for each audio packet:
an audio packet identifier;
a point on the audio output corresponding to the audio packet; and
a predicted time at which the point will be ready for communication.

22. The video conference bridge of claim 21, wherein:
each video packet comprises a first timestamp indicating when the packet was sent; and
the audio packet identifier for each audio packet comprises a second timestamp indicating when the audio packet was sent.

23. The video conference bridge of claim 22, wherein the synchronization information further comprises for each audio packet a third timestamp indicating when the audio packet was received at the audio conference bridge.

24. The video conference bridge of claim 21, wherein the synchronization information further comprises a minimum processing time for the audio conference bridge to generate the audio output stream.

25. A method for synchronizing media in a call, comprising:
receiving at a first call resource a first input stream comprising packets of a first media type;
generating a first output stream in response to the first input stream;
receiving at the first call resource synchronization information from a second call resource, the second call resource operable to generate a second output stream in response to a second input stream comprising packets of a second media type different from the first media type;
communicating the first output stream to an endpoint in synchronization with a second output stream of the second call resource using the synchronization information;
receiving a third input stream at the first call resource, the third input stream comprising a duplicate of the second input stream;
generating a third output stream in response to the third input stream;
communicating a message to the second call resource instructing the second call resource to terminate communication of the second output stream; and
communicating the third output stream to the endpoint.

26. A call resource, comprising:
a first interface operable to receive a first media stream comprising packets of a first media type;
a processor operable to generate a first output stream in response to the first input stream;
a second interface operable to receive synchronization information from an other call resource, the other call resource operable to receive a second media stream comprising packets of a second media type and to generate a second output stream in response, wherein the processor is further operable to communicate the first output stream to a endpoint in synchronization with the second output stream of the other call resource using the synchronization information; and
wherein the first interface is further operable to receive a third input stream, the third input stream comprising a duplicate of the second input stream, and the processor is further operable to construct a third output stream in response to the third input stream.

27. The call resource of claim 26, wherein:
the first interface is further operable to communicate the third output stream to the endpoint; and
the second interface is further operable to communicate a message to the second call resource instructing the second call resource to terminate communication of the second output stream.

28. A method for synchronizing lip movement in video output with speech in audio output, comprising:
receiving a video input stream comprising video packets at a video conference bridge, the video conference bridge operable to generate video output in response to the video stream;
receiving at the video conference bridge synchronization information from an audio conference bridge, the audio conference bridge operable to receive an audio input stream comprising audio packets and to generate audio output in response, wherein the audio conference bridge receives a first audio stream and generates first audio output;
communicating video output from the video conference bridge to one or more video-enabled endpoints using the synchronization information so that the video output is synchronized at the video-enabled endpoints with the corresponding audio output from the audio conference bridge, and the video-enabled endpoints are part of a plurality of endpoints communicating with the audio conference bridge;
receiving a second audio stream at the video conference bridge, the second audio stream comprising a duplicate of the first audio stream;
generating second audio output at the video conference bridge in response the second audio stream;
communicating a message to the audio conference bridge instructing the audio conference bridge to terminate communication of the first audio output; and
communicating the second audio output to the plurality of endpoints.

29. A video conference bridge, comprising:
a first interface operable to receive a video input stream comprising video packets;
a processor operable to generate video output in response to the video input stream;
a second interface operable to receive synchronization information from an audio conference bridge, the audio conference bridge operable to receive an input audio stream comprising audio packets and to generate audio output in response, wherein the processor is further operable to communicate the video output to one or more video-enabled endpoints in synchronization with the audio output using the synchronization information, and wherein:
the video-enabled endpoints are part of a plurality of endpoints;
the audio conference bridge receives a first audio stream and generates first audio output;
the first interface is further operable to receive a second audio stream comprising a duplicate of the first audio stream; and
the processor is further operable to:
generate second audio output in response to the second audio stream;
communicate a message instructing the audio conference bridge to terminate communication of the first audio output; and
communicate the second audio output to the plurality of endpoints.

* * * * *